US011073750B2

(12) United States Patent
Huang (10) Patent No.: US 11,073,750 B2
(45) Date of Patent: Jul. 27, 2021

(54) IMAGE DISPLAY SYSTEM AND IMAGE DISPLAY METHOD FOR INCREASING PERSPECTIVE INFORMATION OF INCIDENT LIGHT OF A THREE-DIMENSIONAL IMAGE

(71) Applicants: BenQ Intelligent Technology (Shanghai) Co., Ltd, Shanghai (CN); BENQ CORPORATION, Taipei (TW)

(72) Inventor: Chen-Cheng Huang, Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 0 days.

(21) Appl. No.: 16/438,423

(22) Filed: Jun. 11, 2019

(65) Prior Publication Data

US 2019/0384153 A1 Dec. 19, 2019

(30) Foreign Application Priority Data

Jun. 19, 2018 (CN) .......................... 201810631343.6

(51) Int. Cl.
*G03B 21/20* (2006.01)
*G02B 27/09* (2006.01)
*G03B 21/56* (2006.01)

(52) U.S. Cl.
CPC ..... *G03B 21/2013* (2013.01); *G02B 27/0955* (2013.01); *G03B 21/56* (2013.01)

(58) Field of Classification Search
CPC ......... H04N 9/3147; H04N 13/00–398; H04N 9/31–3197; G03B 35/20; G03B 21/00–64; G03B 35/00–26; G02B 30/34; G02B 30/26; G02B 30/30; G02B 30/31; G02B 30/32; G02B 30/33; G02B 30/22
See application file for complete search history.

(56) References Cited

U.S. PATENT DOCUMENTS

| 9,791,708 B2 | 10/2017 | Yoneno | |
|---|---|---|---|
| 2013/0176539 A1* | 7/2013 | Kilcher | H04N 9/3179 353/10 |
| 2013/0222557 A1* | 8/2013 | Kuo | G02B 30/24 348/54 |

(Continued)

FOREIGN PATENT DOCUMENTS

| CN | 105278112 A | 1/2016 |
|---|---|---|
| TW | 201737704 A | 10/2017 |
| WO | 2017/169723 A1 | 10/2017 |

*Primary Examiner* — Michelle M Iacoletti
*Assistant Examiner* — Christopher A Lamb, II
(74) *Attorney, Agent, or Firm* — Winston Hsu (57) ABSTRACT

An image display system includes a set of projectors, a screen, and an auxiliary projector. The set of projectors is used for generating a plurality of light beams and projecting the plurality of light beams to a region of an image plane. The screen faces the set of projectors for providing the image plane in order to generate a three-dimensional image object by the plurality of light beams projected to the region of the image plane. The auxiliary projector is used for generating and projecting at least one additional light beam to the region of the image plane in order to increase perspective information of incident light of the three-dimensional image object on a view point within a visual field.

14 Claims, 5 Drawing Sheets

(56) References Cited

U.S. PATENT DOCUMENTS

| | | | | |
|---|---|---|---|---|
| 2015/0355471 A1* | 12/2015 | Yoneno | ............... | G02B 5/128 |
| | | | | 348/51 |
| 2015/0362742 A1* | 12/2015 | Yoneno | ............... | G03B 21/10 |
| | | | | 353/7 |
| 2017/0041596 A1* | 2/2017 | Park | ................... | H04N 13/144 |
| 2017/0371173 A1* | 12/2017 | Bietry | ............. | G02B 26/0891 |
| 2019/0035109 A1* | 1/2019 | Kaji | .................. | G06K 9/4671 |

\* cited by examiner

IMAGE DISPLAY SYSTEM AND IMAGE DISPLAY METHOD FOR INCREASING PERSPECTIVE INFORMATION OF INCIDENT LIGHT OF A THREE-DIMENSIONAL IMAGE

BACKGROUND OF THE INVENTION

1. Field of the Invention

The present invention discloses an image display system and an image display method, and more particularly, an image display system and an image display method for increasing perspective information of incident light of a three-dimensional image.

2. Description of the Prior Art

With advancement of technologies, various multi-functional projectors are developed. Further, some advanced projectors are popularly applied to display high resolution images in our daily life. In recent years, projectors can be categorized as digital light processing (DLP) projectors, three liquid crystal display (3LCD) projectors, and liquid crystal on silicon (LCOS) projectors. The 3LCD projector uses three color swatches for projecting images so that the images displayed on a screen have stable color tones when a brightness control function is enabled. The 3LCD projector can provide images with high color saturation. The LCOS projector integrates technologies of a semiconductor manufacturing process and a liquid crystal manufacturing process. Therefore, the LCOS projector can support a high image resolution, such as a 4K image resolution. The LCOS projector has advantages of providing a satisfactory color tone, contrast, brightness, optical efficiency, and resolution of images. The DLP projector has advantages of providing images with high contrast. The DLP projector has a small body volume in conjunction with a closed optical loop. Further, since the DLP projector is cheap and can provide the images with high contrast and sharp color tones, the DLP projector becomes a major type projector used in recent years.

Since stereoscopic image technologies become popular, the projectors previously mentioned are gradually applied to the stereoscopic image technologies for generating three-dimensional objects. Generally, in the stereoscopic image technologies of naked eyes, the eyes can receive perspective information of several angles of vision of projected images. Then, a human brain can integrate the perspective information of the several angles of vision for virtually generating color depths of the projected images. Finally, a stereoscopic effect of the projected images can be generated within a visual field of the naked eyes. However, in order to generate the perspective information of the several angles of vision, a lot of projectors are required to project light beams with different incident angles to the screen. The more projectors are introduced, the better quality of the stereoscopic effect can be provided. Further, for an image with a very large resolution, even if a projector array is used for generating the stereoscopic effect, since each projector and directions of light beams projected from the each projector are fixed, a three-dimensional image object displayed on a certain region of the screen can only be generated by a part of projectors located on corresponding positions. In other words, for a plurality of projectors with fixed position allocations, the three-dimensional image object displayed on the certain region of the screen can only be generated by a few projectors. Therefore, since quality of the three-dimensional image object cannot be dynamically adjusted, visual experience cannot be optimized.

SUMMARY OF THE INVENTION

In an embodiment of the present invention, an image display system is disclosed. The image display system comprises a set of projectors, a screen, and an auxiliary projector. The set of projectors is configured to generate a plurality of light beams and project the plurality of light beams to a region of an image plane. The screen faces the set of projectors and is configured to provide the image plane for generating a three-dimensional image object by the plurality of light beams projected to the region of the image plane. The auxiliary projector is configured to generate and project at least one additional light beam to the region of the image plane for increasing perspective information of incident light of the three-dimensional image object on a view point within a visual field.

In another embodiment of the present invention, an image display method is disclosed. The image display method comprises projecting a plurality of light beams from a set of projectors to a region of an image plane, generating a three-dimensional image object of the region of the image plane after the plurality of light beams are projected to the region of the image plane, and projecting at least one additional light beam from an auxiliary projector to the region of an image plane for increasing perspective information of incident light of the three-dimensional image object on a view point within a visual field.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
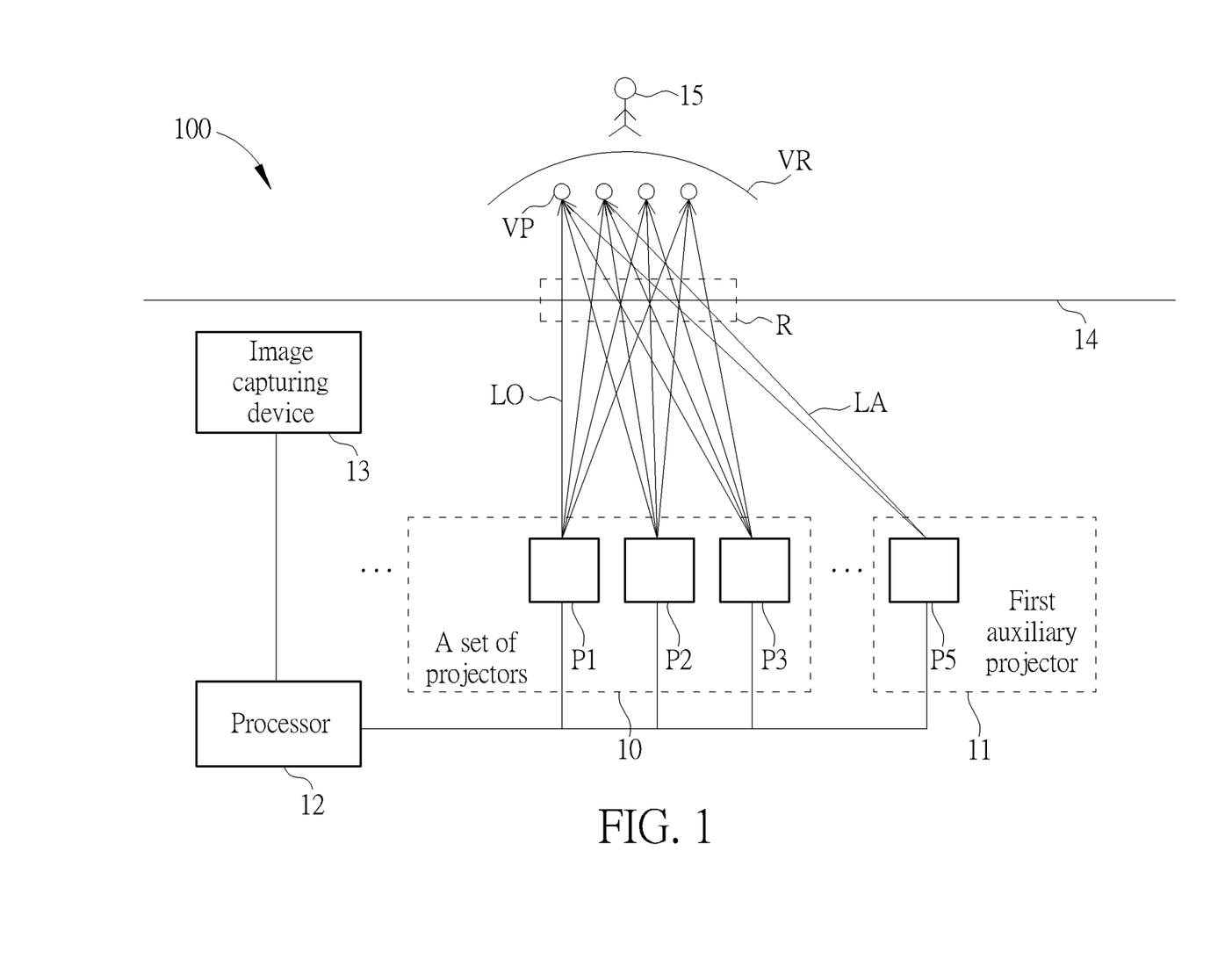
FIG. 1 is a structure of an image display system according to an embodiment of the present invention.

FIG. 1 is a structure of an image display system 100 according to an embodiment of the present invention. The image display system 100 includes a set of projectors 10, a first auxiliary projector 11, a processor 12, an image capturing device 13, and a screen 14. The set of projectors 10 can include a plurality of projectors with arbitrary types, such as digital light processing (DLP) projectors, three liquid crystal display (3LCD) projectors, or liquid crystal on silicon (LCOS) projectors. For simplicity, the DLP projectors are used in the image display system 100 and illustrated later. The set of projectors 10 is used for generating a plurality of light beams LO and projecting the plurality of light beams LO to a region R of an image plane. For example, in FIG. 1, each projector of the set of projectors 10 can generate and project four light beams LO to the image plane. However, the image display system 100 is not limited to the number of projectors and the number of light beams generated by each projector. Any reasonable technology or hardware modification falls into the scope of the present invention. The screen 14 faces the set of projectors 10 for providing the image plane. The screen can generate a three-dimensional image object by using the plurality of light beams LO projected to the region R of the image plane. In the image display system 100, an image receiver 15 can be a viewer. A visual field VR of the image receiver 15 can be an arc range around the image receiver 15. For example, the visual field VR can be defined as an arc range of a line of sight when the viewer turns around. Since the visual field VR is located around the image receiver 15, the image receiver 15 (the viewer) can acquire information of the three-dimensional image object within the visual field VR. In other words, when the image receiver 15 is defined as the viewer, the viewer can be attracted by color/light variations of images within the visual field VR. A view point VP can be defined as a visual terminal of the three-dimensional image object watched by the viewer within the visual field VR through the screen 14. The three-dimensional image object can be generated by the plurality of light beams LO of the set of projectors 10. In other words, the region R of the screen 14 is within the visual field VR. The visual field VR includes at least one view point VP. Therefore, the three-dimensional image object displayed on the screen 14 can be easily received by the image receiver 15 (the viewer). In the image display system 100, each projector of the set of projectors 10 can generate four light beams LO. In practice, each light beam LO can generate an image projected on the screen 14 (or say, image plane) individually. Since projected positions of the four light beams LO of each projector are different, the set of projectors 10 can generate a stereoscopic image with a plurality of angles of vision within the visual field VR. For example, each visual point VP within the visual field VR carries information of the stereoscopic image with four angles of vision. In other words, the image display system 100 can transmit perspective information of incident light of the stereoscopic image with the plurality of angles of vision to the image receiver 15 within the visual field VR.

In order to increase the quality of the three-dimensional image object, the first auxiliary projector 11 of the image display system 100 can generate and project at least one additional light beam LA to the region R of the image plane for increasing the perspective information of the incident light of the three-dimensional image object on the view point VP within the visual field VR. For example, the first auxiliary projector 11 can generate two additional light beams LA to the region R of the image plane for increasing the perspective information of incident light by introducing an additional angle of vision (i.e., from three angles of vision to four angles of vision) of the three-dimensional image object on a leftmost view point VP within the visual field VR. Generally, the three-dimensional image object on the view point VP within the visual field VR carries perspective information of incident light with N angles of vision before the first auxiliary projector 11 projects the at least one additional light beam LA to the region R of the image plane. After the first auxiliary projector 11 projects at least one additional light beam LA to the region R of the image plane, the three-dimensional image object on the view point VP within the visual field VR carries perspective information of incident light with N+1 angles of vision. N is a positive integer greater than one. In other words, after the first auxiliary projector 11 is introduced, the perspective information of incident light within the visual field VR can be increased, thereby increasing quality of the three-dimensional image object.

In the image display system 100, the image capturing device 13 can be used for tracking a position of the image receiver 15. For example, the image capturing device 13 can be any camera or any lens with optical sensing components for tracking a position of a client (i.e., the viewer). The processor 12 is coupled to the image capturing device 13, the set of projectors 10, and the first auxiliary projector 11 for adjusting a plurality of projection directions of the set of projectors 10 and the first auxiliary projector 11 according to the position of the image receiver 15. For example, after the image capturing device 13 acquires an image of the client, image data can be transmitted to the processor 12. The processor 12 can generate the position and priority of the client according to the image data. For example, the processor 12 can recognize identity of the client for determining if the client is a VIP (Very Important Person) member. As previously mentioned, the client can be regarded as the image receiver 15. When the priority of the image receiver 15 is greater than a threshold (i.e., the client is the VIP member), the processor 12 can adjust the plurality of projection directions (i.e., light beams LO and light beams LA) of the set of projectors 10 and the first auxiliary projector 11 to align the image receiver 15 for generating a three-dimensional image object with high quality received by the image receiver 15. Particularly, although the processor 12 can adjust the plurality of projection directions of the set of projectors 10 and the first auxiliary projector 11 to align the image receiver 15 for increasing quality of the three-dimensional image object, the first auxiliary 11 can reserve some light beam resources by optionally enabling a part of available light beams to align at least one view point VP of the image receiver 15. For example, when the first auxiliary projector 11 is capable of projecting four light beams, the processor 12 can control the first auxiliary projector 11 to generate only two light beams with different directions to align the at least one view point VP of the image receiver 15 and project the two light beams to the image plane. Other two light beams of the first auxiliary projector 11 can be reserved to assist projecting images at other positions. Generally, the first auxiliary projector 11 can be used for projecting M light beams to the image plane. P light beams of the M light beams can be projected within the region R of the image plane. M-P light beams can be projected outside the region R of the image plane. M and P are two positive integers and M>P. In other embodiments, the M-P light beams can be projected to another region adjacent to the region R of the image plane for generating an image displayed on another region. By reserving some light beam resources of the first auxiliary projector 11, some following advantages can be provided. First, since the perspective information of incident light within the visual field VR is increased, quality of the three-dimensional image object can be increased. Second, when another three-dimensional image object is required to display on another region of the image plane (screen 14) at the same time, other light beams of the first auxiliary projector 11 can be used for assisting to generate another three-dimensional image object displayed on another region of the image plane. Further, in the image display system 100, positions of two adjacent projectors of the set of projectors 10 are separated by a horizontal interval. A horizontal gap between the first auxiliary projector 11 and the region R is greater than or equal to at least two horizontal intervals. For example, in FIG. 1, positions of the set of projectors 10 from left to right can be denoted as P1 to P3.

The set of projectors 10 is used for generating the three-dimensional image object of the region R of the screen 14 inherently. A position of the first auxiliary projector 11 is denoted as P5. It implies that a horizontal gap between the first auxiliary projector 11 and the region R (generated by the set of projectors 10) is substantially equal to two horizontal intervals (i.e., the horizontal gap between the position P3 and the position P5). However, the image display system 100 is not limited to the position of the first auxiliary projector 11. Any reasonable position allocation of projectors falls into the scope of the present invention.

In FIG. 1, the image display system 100 can be dynamically adjusted according to the position of the image receiver 15 (the viewer). For example, when the viewer (image receiver 15) is located on a right side of the screen 14, the first auxiliary projector can be located at the place P5. The first auxiliary projector at the place P5 can emit light beam to at least one view point VP of the right side, such as two view points of the right side. Since the two view points of the right side face the viewer located on the right side of the screen 14, the perspective information of incident light the two view points of the right side can be increased, thereby increasing quality of the three-dimensional image object. When the viewer (image receiver 15) is located on a left side of the screen 14, the first auxiliary projector can be located at the place P1. The first auxiliary projector at the place P1 can emit light beam to at least one view point VP of the left side, such as two view points of the left side. Since the two view points of the left side face the viewer located on the left side of the screen 14, the perspective information of incident light the two view points of the left side can be increased, thereby increasing quality of the three-dimensional image object.

Figure 2:
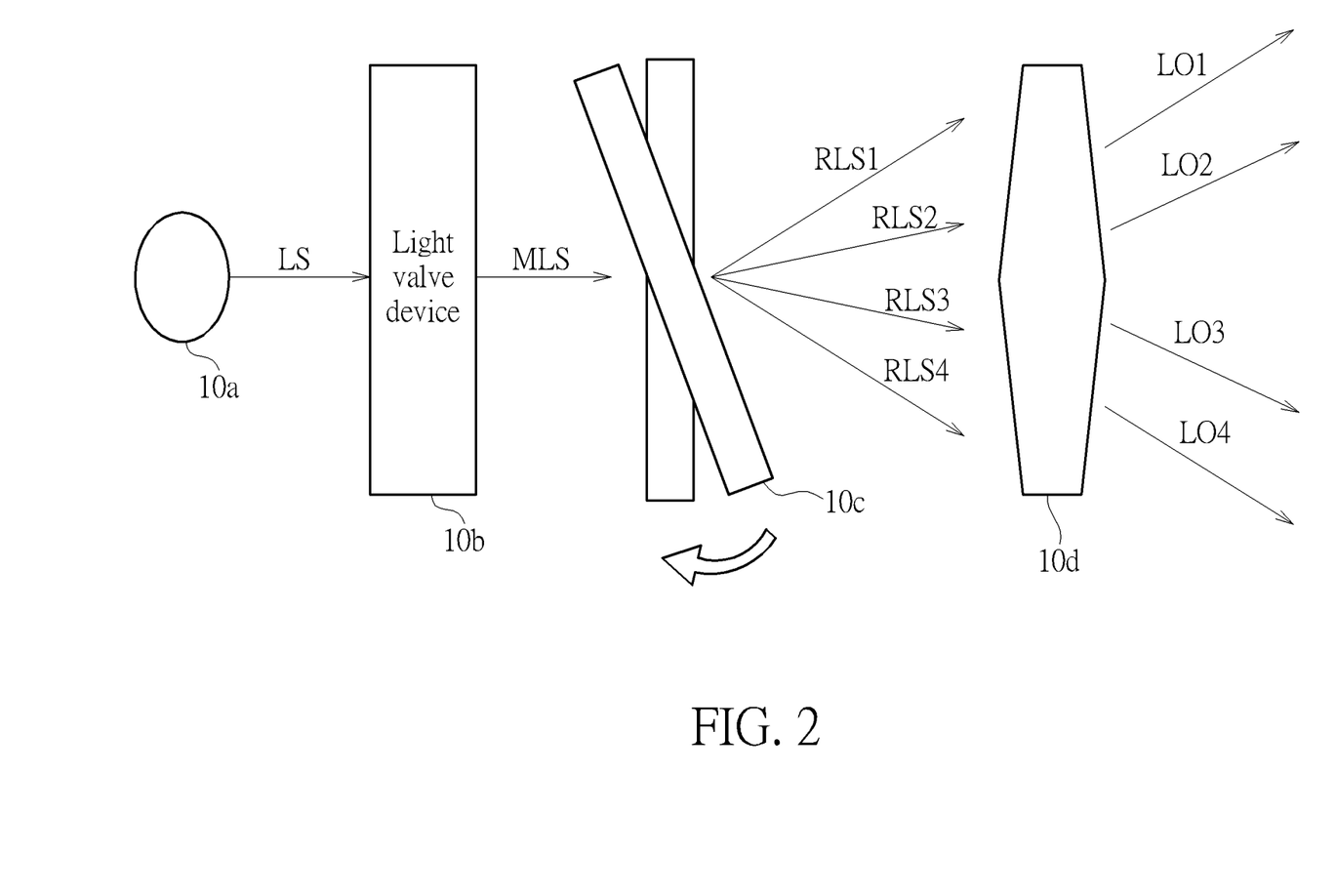
FIG. 2 is a structure of each projector of the image display system in FIG. 1.

FIG. 2 is a structure of each projector of the image display system 100. Each projector of the image display system 100 (i.e., the first auxiliary projector 11 or each projector of the set of projectors 10) can include a light source device 10a, a light valve device 10b, an optical actuator 10c, and a lens device 10d. The light source device 10a is used for converting a digital signal to generate a light signal LS. The light source device 10a can generate the light signal LS along a fixed direction. The light valve device 10b faces the light source device 10a for generating a modulated light signal MLS by modulating the light signal LS. For example, the light valve device 10b can use a refraction modulation technology or a reflection modulation technology for generating the modulated light signal MLS. The optical actuator 10c faces the light valve device 10b for generating a plurality of refracted light signals RLS1 to RLS4 by refracting the modulated light signal MLS at different time slots. For example, the optical actuator 10c can be rotated around a rotating axis. The modulated light signal MLS can be refracted at different time slots by the optical actuator 10c rotated around the rotating axis and converted to the plurality of refracted light signals RLS1 to RLS4. The lens device 10d faces the optical actuator 10c for generating a plurality of outputted light signals LO1 to LO4 by receiving and outputting the plurality of refracted light signals RLS1 to RLS4 at different time slots. In each projector of the image display system 100, at least one outputted light signal (i.e., LO1 and LO2) of the plurality of outputted light signals LO1 to LO4 can form the at least one additional light beam LA to the region R of the image plane for increasing the perspective information of the incident light of the three-dimensional image object on the view point VP within the visual field VR. Further, in FIG. 2, after the plurality of outputted light signals LO1 to LO4 are generated, they can be projected to deferent positions of the image plane. For example, a first outputted light signal LO1 can be projected to a first position of the image plane along a first direction. A second outputted light signal LO2 can be projected to a second position of the image plane along a second direction. A third outputted light signal LO3 can be projected to a third position of the image plane along a third direction. A fourth outputted light signal LO4 can be projected to a fourth position of the image plane along a fourth direction. Further, two adjacent positions of the image plane can be separated by a distance. For example, the first position and the second position can be separated by Q pixels. Q can be a positive integer greater than or equal to four. Further, as previously mentioned, the processor 12 can control the at least one projection direction of the first auxiliary projector 11 according to the position of the image receiver 15. In other words, in FIG. 2, the processor 12 can control the optical actuator 10c of the first auxiliary projector 11 to rotate based on a first rotating angle. Then, after the modulated light signal MLS is refracted by the optical actuator 10c with the first rotating angle according to the position of the image receiver 15, the modulated light signal MLS can be projected to the region R of the image plane around the position of the image receiver 15. Further, the first rotating angle is smaller than or equal to an upper bound rotating angle of the optical actuator 10c. However, when the horizontal gap between the image receiver 15 and the first auxiliary projector 11 is too large, since the first rotating angle is greater than the upper bound rotating angle of the optical actuator 10c, the first auxiliary projector 11 cannot support to project an over-tilted image. Therefore, the processor 12 can control the first auxiliary projector 11 to operate under a standby mode.

Figure 3:
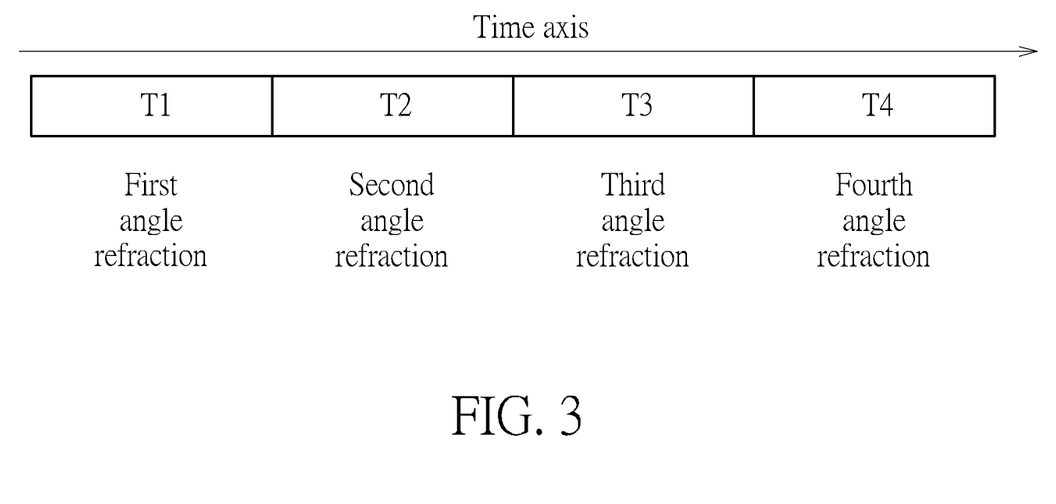
FIG. 3 is an illustration of generating a plurality of outputted light signals with different incident angles at different time slots by the image display system in FIG. 1.

FIG. 3 is an illustration of generating the plurality of outputted light signals LO1 to LO4 with different incident angles at different time slots by the image display system 100. As previously mentioned, the optical actuator 10c can be rotated around the rotating axis. The modulated light signal MLS can be refracted at different time slots by the optical actuator 10c rotated around the rotating axis. For example, after the modulated light signal MLS is refracted at a first time slot T1 by the optical actuator 10c with a first rotating angle, the modulated light signal MLS becomes a first refracted light signal RLS1. Then, the first refracted light signal RLS1 can be converted to a first outputted light signal LO1 emitted along a first direction by the lens device 10d. After the modulated light signal MLS is refracted at a second time slot T2 by the optical actuator 10c with a second rotating angle, the modulated light signal MLS becomes a second refracted light signal RLS2. Then, the second refracted light signal RLS2 can be converted to a second outputted light signal LO2 emitted along a second direction by the lens device 10d. After the modulated light signal MLS is refracted at a third time slot T3 by the optical actuator 10c with a third rotating angle, the modulated light signal MLS becomes a third refracted light signal RLS3. Then, the third refracted light signal RLS3 can be converted to a third outputted light signal LO3 emitted along a third direction by the lens device 10d. After the modulated light signal MLS is refracted at a fourth time slot T4 by the optical actuator 10c with a fourth rotating angle, the modulated light signal MLS becomes a fourth refracted light signal RLS4. Then, the fourth refracted light signal RLS4 can be converted to a fourth outputted light signal LO4 emitted along a fourth direction by the lens device 10d. By doing so, since the four refracted light signals RLS1 to RLS4 can be emitted along four directions, four outputted light signals LO1 to LO4 can be projected to four different positions of the image plane.

In other words, in FIG. 3, an operational frequency of the optical actuator 10c is four times of a frequency of the light signal LS generated by the light source device 10a.

Figure 4:
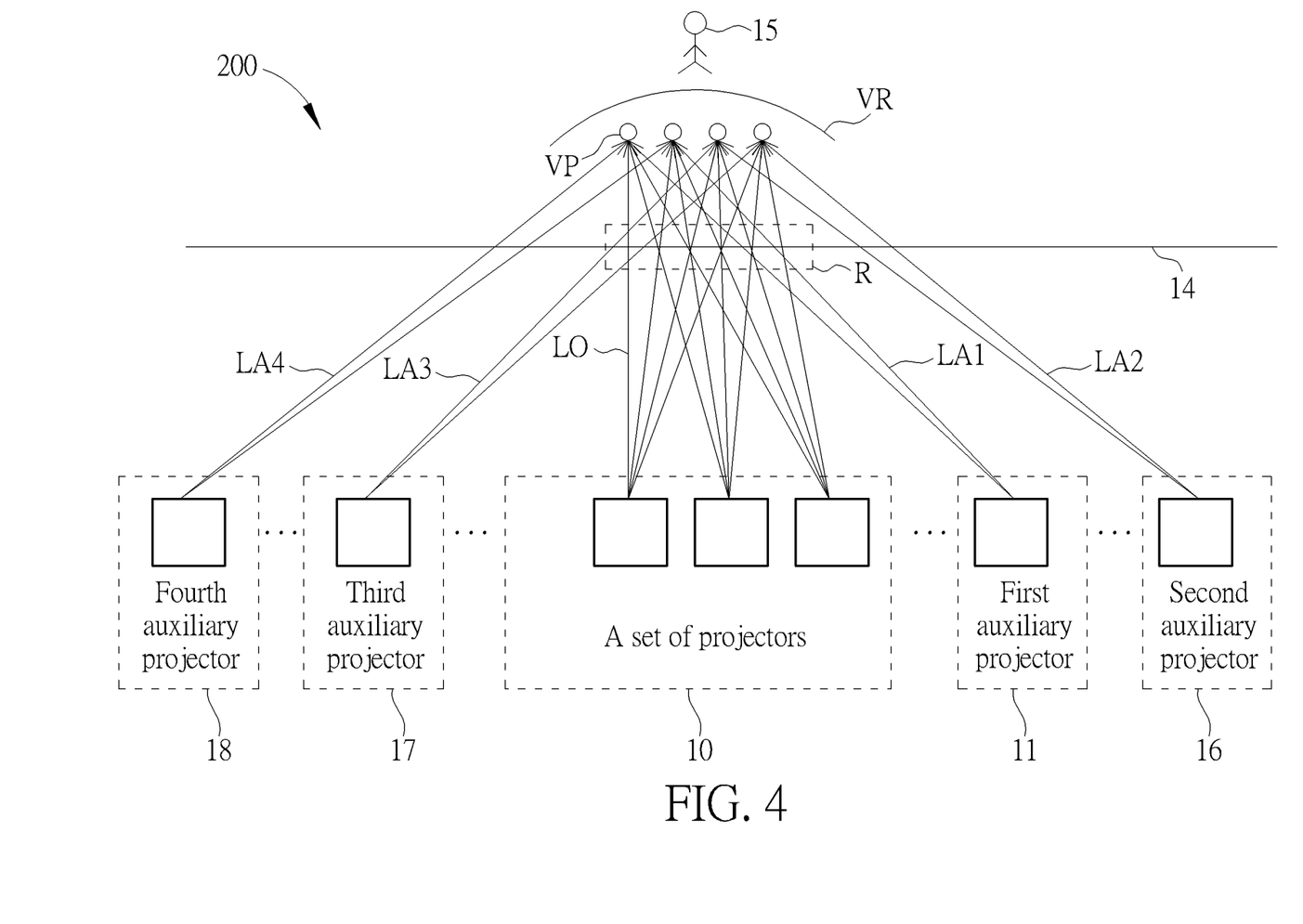
FIG. 4 is an illustration of introducing a plurality of auxiliary projectors of the image display system in FIG. 1.

FIG. 4 is an illustration of introducing a plurality of auxiliary projectors of the image display system 100. To avoid ambiguity, the image display system with the plurality of auxiliary projectors is denoted as an image display system 200. Further, for simplicity, illustrations the image capturing device 13 and the processor 12 previously mentioned are omitted here. In the image display system 200, the first auxiliary projector 11 can be used for increasing quality of the three-dimensional image object on the view point VP within the visual field VR. The image display system 200 can further use a second auxiliary projector 16, a third auxiliary projector 17, and a fourth auxiliary projector 18 for further increasing quality of the three-dimensional image object on the view point VP within the visual field VR. The second auxiliary projector 16, the third auxiliary projector 17, and the fourth auxiliary projector 18 can be coupled to the processor 12 previously mentioned. Further, the second auxiliary projector 16 can be used for generating and projecting at least one additional light beam LA2 to the image plane for increasing the perspective information of the incident light of the three-dimensional image object within the visual field VR. Similarly, the third auxiliary projector 17 can be used for generating and projecting at least one additional light beam LA3 to the image plane for increasing the perspective information of the incident light of the three-dimensional image object within the visual field VR. The fourth auxiliary projector 18 can be used for generating and projecting at least one additional light beam LA4 to the image plane for increasing the perspective information of the incident light of the three-dimensional image object within the visual field VR. Further, the first auxiliary projector 11 and the second auxiliary projector 16 can be two adjacent or non-adjacent projectors. The third auxiliary projector 17 and the fourth auxiliary projector 18 can be two adjacent or non-adjacent projectors. Any reasonable number of design or position allocation of the auxiliary projectors falls into the scope of the present invention. In the image display system 200, it is assumed that each projector of the set of projectors 10 can generate four light beams along four directions. When the first auxiliary projector 11, the second auxiliary projector 16, the third auxiliary projector 17, and the fourth auxiliary projector 18 are absent, the perspective information of incident light with 3×4=12 angles within the visual field VR is received by the image receiver 15. However, after the first auxiliary projector 11, the second auxiliary projector 16, the third auxiliary projector 17, and the fourth auxiliary projector 18 are introduced to the image display system 200, the perspective information of incident light with 12+8=20 angles within the visual field VR is received by the image receiver 15. In other words, when more auxiliary projectors are introduced to the image display system 200, the perspective information of incident light within the visual field VR can include more information of angles of vision. Therefore, quality of the three-dimensional image object can be improved.

Figure 5:
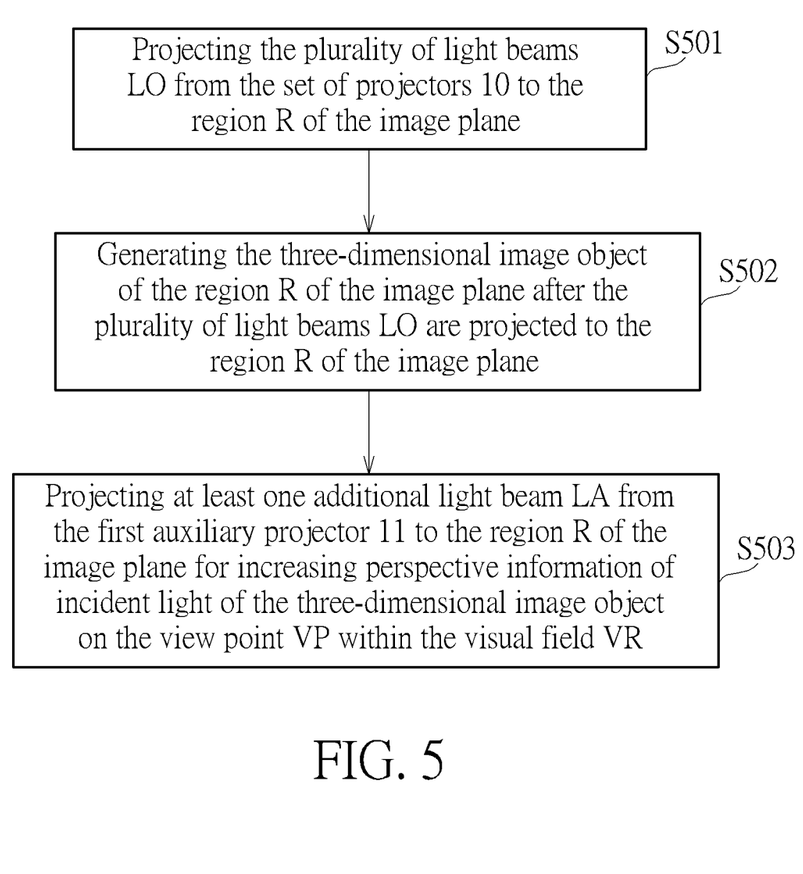
FIG. 5 is a flow chart of an image display method performed by the image display system in FIG. 1.

FIG. 5 is a flow chart of an image display method performed by the image display system 100. The image display method includes step S501 to step S503. Any reasonable technology modification falls into the scope of the present invention. Step S501 to step S503 are illustrated below.

step S501: projecting the plurality of light beams LO from the set of projectors 10 to the region R of the image plane;

step S502: generating the three-dimensional image object of the region R of the image plane after the plurality of light beams LO are projected to the region R of the image plane;

step S503: projecting at least one additional light beam LA from the first auxiliary projector 11 to the region R of the image plane for increasing perspective information of incident light of the three-dimensional image object on the view point VP within the visual field VR.

Details of step S501 to step S503 are illustrated previously. Thus, they are omitted here. As previously mentioned, each auxiliary projector can reserve some light beam resources by optionally enabling a part of available light beams to align at least one view point of the image receiver 15. For example, each auxiliary projector is capable of projecting four light beams. The processor 12 can control each auxiliary projector to generate only two light beams with different directions to align the at least one view point of the image receiver 15 and project to the image plane. Therefore, since some light beam resources of each auxiliary projector can be reserved, two or more image receivers 15 can be supported simultaneously by the image display system 100 and the image display system 200. In other words, when at least two image receivers 15 are located at different positions, three-dimensional image information can be generated and transmitted to the at least two image receivers 15 simultaneously.

To sum up, the present invention discloses an image display system and an image display method. The image display system can display a three-dimensional image object on an image plane (i.e., a screen) so that an image receiver can receive information of the three-dimensional image object. In order to improve quality of the three-dimensional image object, at least one auxiliary projector can be introduced to the image display system. Each auxiliary projector of the at least one auxiliary projector can be used for projecting at least one light beam to the image plane for increasing perspective information of incident light of the three-dimensional image object on the view point within the visual field of the image receiver. Therefore, resolution of the three-dimensional image object can be increased. Further, a processor of the image display system can dynamically adjust light beam resources of each projector. Therefore, the image display system of the present invention is capable of increasing quality of the three-dimensional image object and dynamically adjusting the light beam resources with low hardware complexity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image display system comprising:
    a set of projectors configured to generate a plurality of light beams and project the plurality of light beams to a region of an image plane;
    a screen facing the set of projectors and configured to provide the image plane for generating a three-dimensional image object by the plurality of light beams projected to the region of the image plane;
    a first auxiliary projector configured to generate and project at least one additional light beam to the region of the image plane for increasing perspective information of incident light of the three-dimensional image object on a view point within a visual field, the first auxiliary projector comprising:

a light source device configured to generate a light signal;

a light valve device facing the light source device and configured to generate a modulated light signal by modulating the light signal;

an optical actuator facing the light valve device and configured to generate a plurality of refracted light signals by refracting the modulated light signal at different time slots; and a lens device facing the optical actuator and configured to generate a plurality of outputted light signals by receiving and outputting the plurality of refracted light signals at the different time slots;

an image capturing device configured to track a position of an image receiver; and a processor coupled to the image capturing device, the set of projectors, and the first auxiliary projector and configured to adjust a plurality of projection directions of the set of projectors and the first auxiliary projector according to the position of the image receiver;

wherein the processor controls the image capturing device to generate a priority of the image receiver after the processor recognizes an identity of the image receiver, and when the priority is greater than a threshold, the processor dynamically adjusts the plurality of projection directions of the set of projectors and the first auxiliary projector according to the identity of the image receiver to align the image receiver for improving quality of a three-dimensional image received by the image receiver, and at least one outputted light signal of the plurality of outputted light signals forms the at least one additional light beam to the region of the image plane for increasing the perspective information of the incident light of the three-dimensional image object on the view point within the visual field.

2. The system of claim 1, wherein the three-dimensional image object on the view point within the visual field carries perspective information of incident light with N angles before the first auxiliary projector projects the at least one additional light beam to the region of the image plane, after the first auxiliary projector projects the at least one additional light beam to the region of the image plane, the three-dimensional image object on the view point within the visual field carries perspective information of incident light with N+1 angles, and N is a positive integer greater than one.

3. The system of claim 1, wherein the first auxiliary projector is configured to project M light beams to the image plane, P light beams of the M light beams are projected within the region of the image plane, M-P light beams are projected outside the region of the image plane, M and P are two positive integers and M>P.

4. The system of claim 3, wherein the M-P light beams are projected to another region adjacent to the region of the image plane for generating an image displayed on the another region.

5. The system of claim 1, wherein positions of two adjacent projectors of the set of projectors are separated by a horizontal interval, and a horizontal gap between the first auxiliary projector and the region is greater than or equal to at least two horizontal intervals.

6. The system of claim 1, further comprising:

a second auxiliary projector configured to generate and project at least one additional light beam to the region of the image plane for increasing the perspective information of the incident light of the three-dimensional image object on the view point within the visual field;

wherein the first auxiliary projector and the second auxiliary projector are adjacent or non-adjacent.

7. The system of claim 1, wherein the optical actuator is rotated around a rotating axis, the modulated light signal is refracted at the different time slots by the optical actuator rotated around the rotating axis and converted to the plurality of refracted light signals.

8. The system of claim 7, wherein after the modulated light signal is refracted at a first time slot by the optical actuator with a first rotating angle, the modulated light signal is converted to a first outputted light signal emitted along a first direction by the lens device, and after the modulated light signal is refracted at a second time slot by the optical actuator with a second rotating angle, the modulated light signal is converted to a second outputted light signal emitted along a second direction by the lens device.

9. The system of claim 8, wherein the first outputted light signal emitted along the first direction is projected to a first position of the image plane, the second outputted light signal emitted along the second direction is projected to a second position of the image plane, the first position and the second position are separated by Q pixels, and Q is a positive integer greater than or equal to four.

10. The system of claim 7, wherein after the modulated light signal is refracted at a first time slot by the optical actuator with a first rotating angle according to a position of an image receiver, the modulated light signal is projected to a region of the image plane around the position of the image receiver, and the first rotating angle is smaller than or equal to an upper bound rotating angle of the optical actuator.

11. An image display method comprising:

projecting a plurality of light beams from a set of projectors to a region of an image plane;

generating a three-dimensional image object of the region of the image plane after the plurality of light beams are projected to the region of the image plane;

generating a priority of an image receiver by using an image capturing device after an identity of the image receiver is recognized; and dynamically adjusting a plurality of projection directions of the set of projectors and a first auxiliary projector according to the identity of the image receiver to align the image receiver for projecting light beams from the set of projectors and at least one additional light beam from the first auxiliary projector for increasing perspective information of incident light of the three-dimensional image object on a view point within a visual field of the image receiver when the priority is greater than a threshold;

wherein the first auxiliary projector comprises a light source device configured to generate a light signal, a light valve device facing the light source device and configured to generate a modulated light signal by modulating the light signal, an optical actuator facing the light valve device and configured to generate a plurality of refracted light signals by refracting the modulated light signal at different time slots, and a lens device facing the optical actuator and configured to generate a plurality of outputted light signals by receiving and outputting the plurality of refracted light signals at the different time slots; and wherein at least one outputted light signal of the plurality of outputted light signals forms the at least one additional light beam to the region of the image plane for increasing the perspective information of the incident light of the three-dimensional image object on the view point within the visual field.

12. The method of claim 11, further comprising:
tracking a position of an image receiver; and
adjusting a plurality of projection directions of the set of projectors and the first auxiliary projector according to the position of the image receiver.

13. The method of claim 11, wherein the first auxiliary projector projects M light beams to the image plane, P light beams of the M light beams are projected within the region of the image plane, M-P light beams are projected outside the region of the image plane, M and P are two positive integers and M>P.

14. The method of claim 11, further comprising:
projecting at least one additional light beam from a second auxiliary projector to the region of the image plane for increasing the perspective information of the incident light of the three-dimensional image object on the viewpoint within the visual field.

* * * * *